(12) United States Patent
Agerstam et al.

(10) Patent No.: US 9,026,163 B2
(45) Date of Patent: May 5, 2015

(54) METHODS AND ARRANGEMENTS TO OFFLOAD SCANS OF A LARGE SCAN LIST

(75) Inventors: Mats Agerstam, Portland, OR (US); Amir Shenhav, Netanya (IL)

(73) Assignee: Intel Corporation, Santa Clara, CA (US)

( * ) Notice: Subject to any disclaimer, the term of this patent is extended or adjusted under 35 U.S.C. 154(b) by 449 days.

(21) Appl. No.: 13/436,928

(22) Filed: Mar. 31, 2012

(65) Prior Publication Data

US 2013/0260813 A1    Oct. 3, 2013

(51) Int. Cl.
| | | |
|---|---|---|
| H04W 4/00 | (2009.01) |
| H04B 7/00 | (2006.01) |
| H04M 1/00 | (2006.01) |
| H04M 1/725 | (2006.01) |
| H04W 48/08 | (2009.01) |
| H04W 48/16 | (2009.01) |
| H04W 8/18 | (2009.01) |

(52) U.S. Cl.
CPC ............... *H04W 48/08* (2013.01); *H04W 8/18* (2013.01); *H04W 48/16* (2013.01)

(58) Field of Classification Search
CPC .................................................... H04W 48/08
USPC ............... 455/517, 422, 412.1, 550.1
See application file for complete search history.

(56) References Cited

U.S. PATENT DOCUMENTS

| | | | |
|---|---|---|---|
| 7,026,964 B2 | 4/2006 | Baldwin et al. | |
| 7,388,844 B1 | 6/2008 | Brown et al. | |
| 8,190,850 B1 * | 5/2012 | Davenport et al. | 711/202 |
| 8,230,510 B1 * | 7/2012 | Yang et al. | 726/24 |

FOREIGN PATENT DOCUMENTS

| | | |
|---|---|---|
| WO | 03081819 A1 | 10/2003 |
| WO | 2013149174 A1 | 10/2013 |

OTHER PUBLICATIONS

International Search Report and Written Opinion received for PCT Patent Application No. PCT/US2013/034651 mailed on Jul. 1, 2013, 9 pages.
International Preliminary Report on Patentability and Written Opinion received for PCT Application No. PCT/US2013/034651 mailed on Oct. 9, 2004, 6 pages.

* cited by examiner

*Primary Examiner* — Tilahun B Gesesse
(74) *Attorney, Agent, or Firm* — Schubert Law Group PLLC

(57) ABSTRACT

Embodiments describe arrangements related to offload scanning of large scan lists. Embodiments may comprise logic such as hardware and/or code to facilitate offloading of the scans of large scan lists, e.g., lists on the order of thousands of networks or access points for networks, to network adapters such as wireless network interface cards. Many embodiments provide a network adapter with a compressed representation of a large scan list that may not fit uncompressed in memory of the network adapter. In some embodiments, the compressed representation of the scan list may be lossy, introducing balances related to the memory size on the network adapter, the extent of compression, and the list size, as well as a balance between the memory size and a probability of false positives. In many embodiments, the network adapter may wake the host device upon identifying a network on a scan list.

22 Claims, 4 Drawing Sheets

FIG. 1A

| SSID VALUE | AUTHENTICATION MODE | ENCRYPTION TYPE | OTHER FIELDS |
|---|---|---|---|
| | | | |

COMPRESSED ACCESS POINT / SCAN LIST
1100

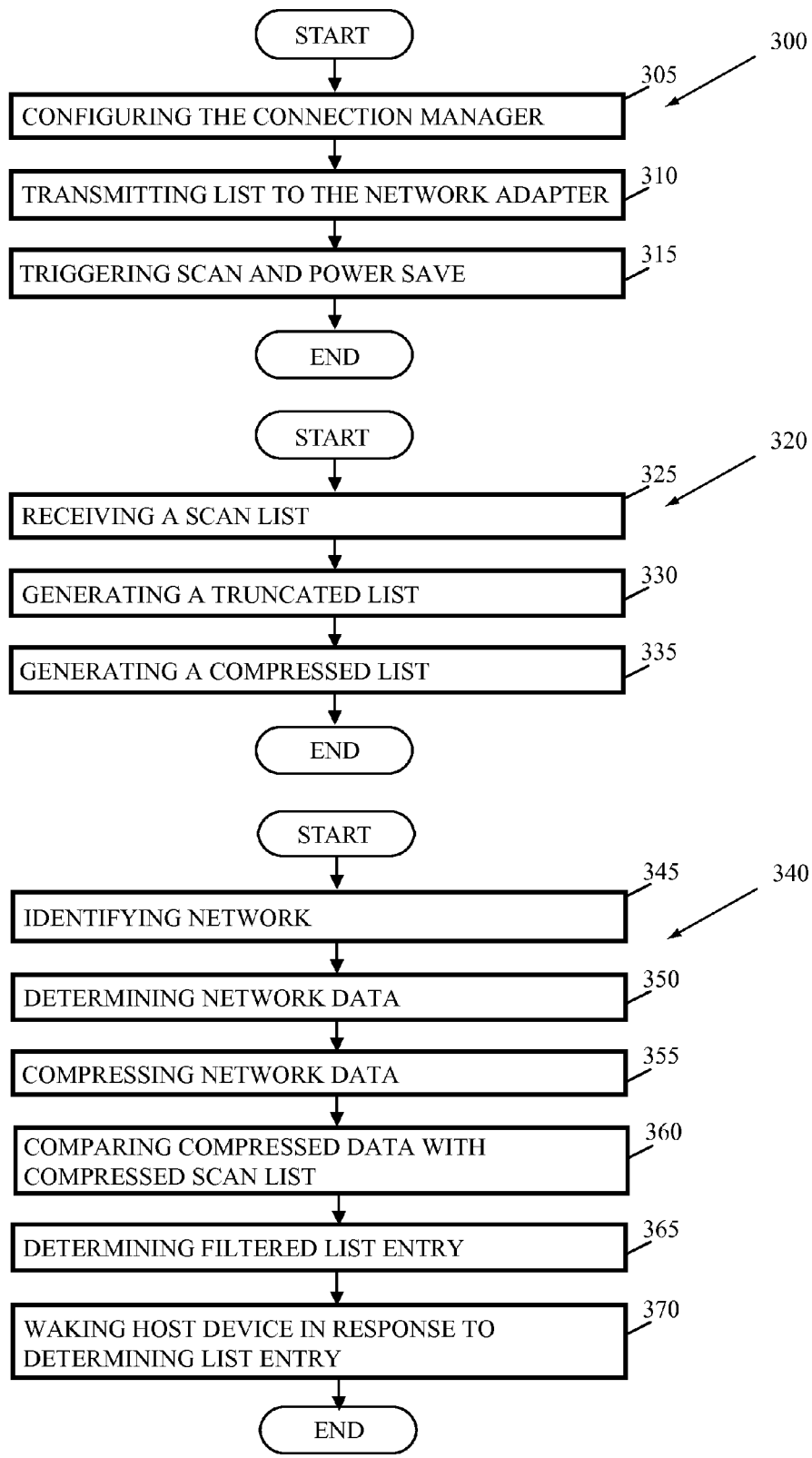

METHODS AND ARRANGEMENTS TO OFFLOAD SCANS OF A LARGE SCAN LIST

BACKGROUND

Embodiments are in the field of wireless communications. More particularly, embodiments are in the field of offloading scans of a large scan list to identify selected network availability.

BRIEF DESCRIPTION OF THE DRAWINGS

FIG. 1A depicts an embodiment of a compressed scan list to identify selected network availability;

FIG. 3A-C depict embodiments of flowcharts to offload scans to identify selected network availability.

DETAILED DESCRIPTION OF EMBODIMENTS

Figure 1:
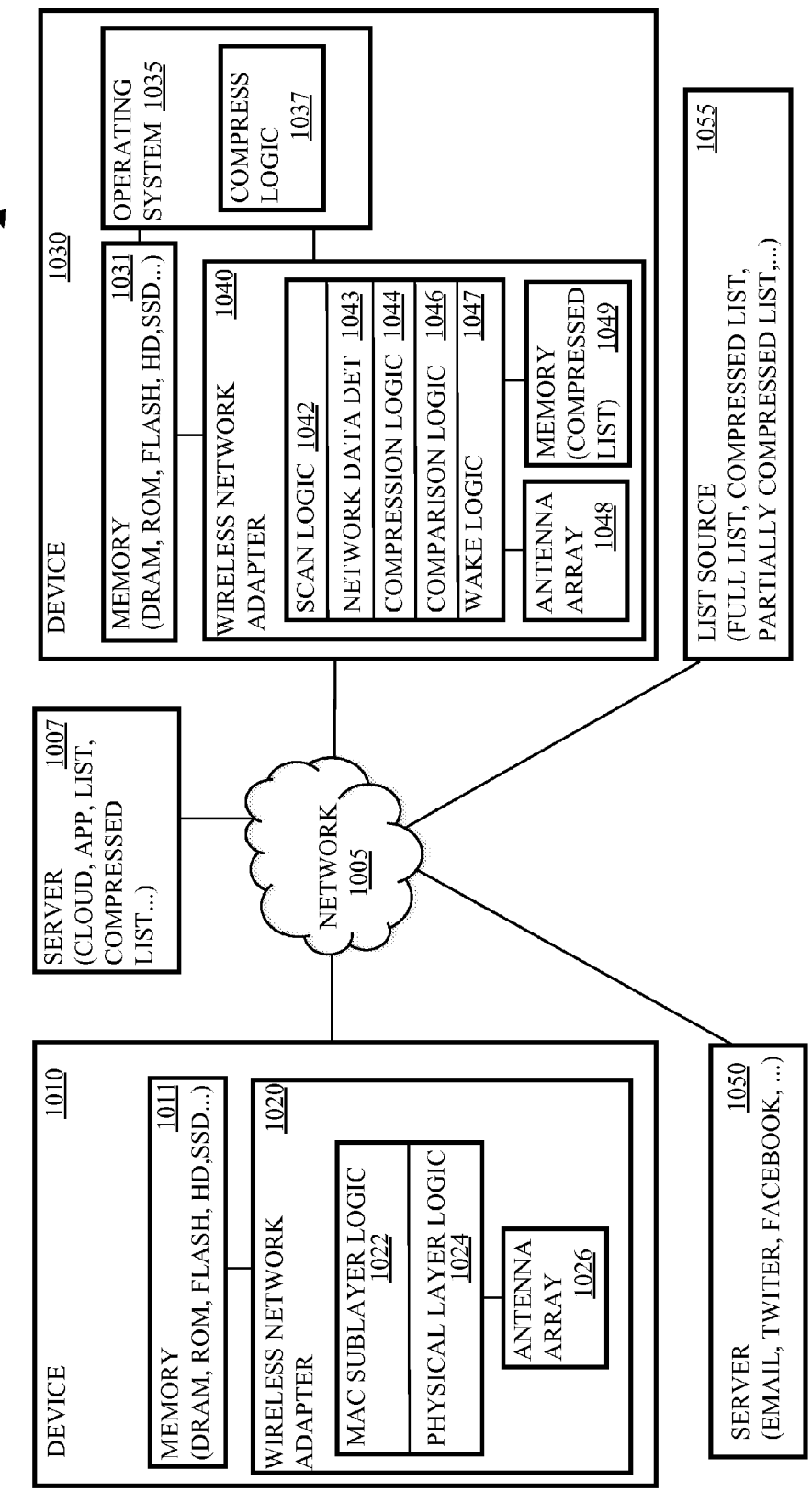
FIG. 1 depicts an embodiment of a wireless network comprising a plurality of communications devices, including multiple fixed or mobile communications devices.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives as defined by the appended claims. The detailed descriptions below are designed to make such embodiments understandable and obvious to a person having ordinary skill in the art.

References to "one embodiment," "an embodiment," "example embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Generally, embodiments describe arrangements to offload scanning of large scan lists and/or related arrangements. Embodiments may comprise logic such as hardware and/or code to facilitate offloading of the scans of large scan lists, e.g., lists on the order of thousands of networks and devices such as access points (APs) for networks, to network adapters such as wireless network interface cards. Many embodiments may provide a network adapter with a compressed representation of a large scan list that may not otherwise fit in the memory of the network adapter. In some embodiments, the compressed representation of the large scan list may be lossy (one way), introducing balances related to the memory size on the network adapter, the extent of compression, and the list size, as well as a balance between the memory size and a probability of false positives. In many embodiments, the network adapter may wake the host upon identifying a network on a scan list to facilitate receipt of email, news feeds, tweets, or other data services.

Various embodiments may be designed to address different technical problems associated with offloading of the scans of large scan lists. For instance, some embodiments may be designed to address one or more technical problems such as accommodating the large scan lists in the memory of the network adapter, compressing scan lists, and determining an extent of compression. The technical problem of compressing a scan list may involve determining elements of the scan list to compress and, in some embodiments, determining which elements of the scan lists can be removed, truncated, or otherwise shortened to determine a compressed scan list. Other technical problems may involve determining a method of compression.

Further embodiments may be designed to address one or more other technical problems such as collecting data about the network or device such as a service set identifier. Some embodiments may also collect data such as an authentication mode of a network, an encryption type, and/or other fields or information elements. In several embodiments, the technical problem of collecting data about the network may involve a passive approach such as waiting to receive beacons or the like from networks. In further embodiments, addressing problems such as collecting data about the network may involve querying an access point in response to receiving a beacon to determine additional data. In still further embodiments, addressing problems such as collecting data may involve actively probing for networks to find networks and collect network data. Addressing other technical problems may involve adjusting parameters such as a size of a compressed list, adjusting bit map size (size of the memory space available for the compressed scan list), adjusting the extent of compression such as adjusting the number of hash functions applied to the scan list, and/or balancing the false positive probability against an extent of compression applied to the scan list.

Technical problems such as one or more of the technical problems discussed above, have not been known in the art until discovery and teaching represented by this disclosure. A lack of understanding of technical problems led to the failure of current art to conceive of, discuss, and describe the solutions such as the solutions described by this disclosure. In other words, the solutions presented herein were not obvious in the art due at least in part to a lack of knowledge of the technical problems by other persons of skill in the art.

Different technical problems such as those discussed above may be addressed by one or more different embodiments. For instance, some embodiments that are designed to address identifying a network may do so by one or more different technical means such as querying a network in response to receiving a beacon to determine additional network data. In further embodiments, addressing problems such as collecting data may involve actively probing for networks. Addressing other technical problems may involve adjusting parameters such as a size of a compressed scan list, adjusting bit map size (size of the memory space available for the compressed scan list), adjusting the extent of compression such as adjusting the number of hash functions applied to the scan list, and/or balancing the false positive probability against an extent of compression applied to the scan lists or memory size/space available in the network adapter. The false positive probability relates to false wake ups of the host device and the probability reduces by orders of magnitude with increases in the amount of memory required in the network adapter. Many of these embodiments use space efficient probabilistic data structures such as Bloom Filters to construct the compressed scan list to fit the space constraints of the memory of the network adapter.

In several embodiments, additional filters may be used to reduce the size of the scan lists prior to application of compression. In some embodiments, for instance, fields of the scan lists may be truncated or omitted to reduce the size of the scan lists. In one embodiment, the scan lists may be reduced to a service set identifier such as values of a service set identifier field and/or a basic service set identifier (BSSID) field. In further embodiments, the scan lists may be reduced to two or three fields such as the service set identifier, an authentication mode, and an encryption type. Other embodiments may implement different fields and/or informational elements, and/or may utilize more fields or fewer fields.

In several embodiments, filters such as Bloom Filters or other related filters are used to test whether an element, a network or device, is a member of a set (the compressed scan list) or not. In such embodiments, false positives are possible but false negatives are not. Bloom filters and other related filters work with hashing functions, which are one-way functions that have the property of transforming a data representation to a smaller set.

In some embodiments, the parameters of the filter or filters may be carefully tuned to reach the required performance and memory trade off. Tuning the filter in such embodiments may involve tuning the supported size of scan list, bitmap size (which implies required network adapter memory space), number of hash functions used, and the false positive probability.

Some embodiments may take advantage of Wireless Fidelity (Wi-Fi) network ubiquity, enabling new applications that often require low power consumption, among other unique characteristics, to search for and find a network such as an access point (AP) from which to download data. Wi-Fi generally refers to devices that implement the IEEE 802.11-2007, IEEE Standard for Information technology—Telecommunications and information exchange between systems—Local and metropolitan area networks—Specific requirements Part 11: Wireless LAN Medium Access Control (MAC) and Physical Layer (PHY) Specifications (http://standards.ieee-.org/getieee802/download/802.11-2007.pdf) and other related wireless standards.

Several embodiments comprise access points (APs) for and/or client devices of APs or stations (STAB) such as routers, switches, servers, workstations, netbooks, mobile devices (Laptop, Smart Phone, Tablet, and the like), as well as sensors, meters, controls, instruments, monitors, appliances, and the like.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1007, 1030, 1050, and 1055 via the network 1005. The communications device 1010 may comprise an access point (AP). The communications device 1030 may comprise a low power communications device such as a sensor, a consumer electronics device, a personal mobile device, or the like, and may scan the network 1005 for APs such as the communications device 1010. And communications devices 1007, 1050, and 1055 may comprise sensors, stations, access points, hubs, switches, routers, computers, laptops, netbooks, cellular phones, smart phones, PDAs (Personal Digital Assistants), or other wireless-capable devices. Thus, communications devices may be mobile or fixed. For example, the communications device 1030 may comprise a smart phone for a person that is travelling and communications device 1010 may comprise an AP of a hot spot that allows connectivity to a number of networks. The smart phone may be capable of email, tweets, and the like and may scan for network availability while the device is in a sleep mode to gather email and tweets while conserving power.

Initially, communications device 1030 may enter a geographical area that is within the coverage area of the communications device 1010. The communications device 1010 may periodically transmit beacons to provide information to associated communications devices and to provide information to devices like communications device 1030. Communications device 1030 may be in a first sleep state that facilitates scanning by a wireless network adapter 1040 and the scan logic 1042 of the wireless network adapter 1040 may receive the beacon frame from communications device 1010 via an antenna array 1048. The network data determiner 1043 of the wireless network adapter 1040 may determine or parse network data based upon the beacon and hash, filter, or otherwise compress the data in accordance with the compression performed on a compressed scan list in memory 1049 of the wireless network adapter 1040.

After compressing the network data determined from the beacon, the comparison logic 1046 of the wireless network adapter 1040 may compare the compressed network data gathered from the beacon against compressed entries in the compressed scan list in memory 1049. If an entry is found to match, wake logic 1047 of the wireless network adapter 1040 may wake the communications device 1030 to a second power state and, thereafter send a communication to associate with communications device 1010. Periodically, the communications device 1030 may initiate communications with the communications device 1010 to update email, tweets, etc. from, e.g., the server 1050 and or other servers.

On the other hand, if no entry in the compressed scan list in memory 1049 is found to match, wake logic 1047 of the wireless network adapter 1040 may not wake the communications device 1030 and the scan logic 1042 may continue to monitor for networks in the compressed scan list.

The compressed scan list in memory 1049 may comprise a compressed list of networks and devices such as access points, hot spots, and the like. The host device, which is communications device 1030, or another device may create the list. To scan, e.g., WiFi networks with a reduced power consumption, the host device may enter a sleep mode that leaves the network adapter in a partially or fully powered state and offload the scan procedure to the network adapter 1040. The network adapter 1040 is provided with a list of, e.g., APs or devices to scan for and is instructed to wake the host device to update the host device when a pre-configured network is found. With the proliferation of access points, hot spots (e.g., HS 2.0), and smart phones, the size of feasible scan lists have become large and will likely continue to grow. However, since the memory 1049 of the network adapter 1040 is very constrained in terms of size, the space available in the memory 1049 places limits on the size of the scan list. Thus, the communications device 1030, network adapter 1040, or another device may compress the scan list to provide access to a very large scan list (e.g. in order of thousands of APs) by the wireless network adapter 1040.

FIG. 1 illustrates potential sources of scan lists and compressed scan lists including a server 1007 and a list source 1055. In some embodiments, the list source 1055 may provide a scan list to the communications device 1030. The communications device 1030 may compress the scan list and transmit the compressed scan list to the wireless network adapter 1040. In further embodiments, the wireless network adapter 1040 may utilize the compression logic 1044 to compress the scan list and store the compressed scan list in the memory 1049.

In several embodiments, the list source 1055 may provide the scan list to the server 1007 or the communications device 1030 may provide the scan list to the server 1007 and the server 1007 may compress the scan list. The server 1007 may then transmit the compressed scan list to the wireless network adapter 1040 either directly or via the communications device 1030.

In some embodiments, multiple stages of compression may occur. For example, in one embodiment, the communications device 1030 may receive a partially compressed scan list from the server 1007 or the list source 1055. The partially compressed scan list may comprise a scan list that comprises a reduced set of networks and devices based upon, e.g., the geographical area of the communications device 1030, preferences presented to the server 1007 or list source 1055 by the communications device 1030, or the like. In further embodiments, the list source 1055 or the server 1007 may compress or hash portions of the entries. In some embodiments, for example, the list source 1055 may provide a scan list to the communications device 1030 as well as a compressed or partially compressed scan list to communications device 1030 to reduce the processing time to compress the scan list by the communications device 1030. For instance, the full scan list may comprise data to facilitate accurate identification of the network by the communications device 1030 while the compressed or partially compressed scan list may provide, e.g., a 0.0935% probability of a false positive.

In several embodiments, compressing the scan list may involve omitting fields or elements of the scan list and/or truncating fields or elements in the scan list. For example, the memory 1031 and/or 1049 may comprise mapping information to relate a hash of a service set identification (SSID) to a full SSID. In some embodiments, compressing the scan list may involve hashing or repeatedly hashing the scan list and, in several of these embodiments, compressing may comprise hashing the scan list one or more times to implement a Bloom filter.

The communications device 1030 may comprise compression logic 1037 to compress a scan list or add another layer of compression to the scan list. For example, the communications device 1030 may generate the scan list in memory 1031 based upon preferred or selected networks determined by user preferences, default preferences, or otherwise selected preferences for selection of networks. The compression logic 1037 of the operating system 1035 of the communications device 1030 may remove fields from the scan list, truncate one or more fields of the scan list, and compress one or more fields of the scan list to generate a compressed scan list in memory 1031. The compression logic 1037 may store the compressed scan list in memory 1049 or generate a compressed scan list in memory 1049.

In some embodiments, the communications device 1030 may comprise filters for the scan list to remove entries for access points or networks that are not within the geographical area of the communications device 1030, or are not otherwise within a list of networks for which the communications device 1030 requests that the wireless network adapter 1040 wake the communications device 1030.

In further embodiments, the communications device 1030 may receive a scan list or generate a scan list and provide the scan list to the wireless network adapter 1040. The wireless network adapter 1040 may utilize the network logic 1043 to reduce the number of fields for each network or access point entry in the scan list such as the compressed access point/scan list 1100 illustrated in FIG. 1A. The compressed access point/scan list 1100 comprises the fields server set identifier (SSID), authentication mode, encryption type, and other fields. In some embodiments, the other fields may include informational elements (IEs) or other parameters that identify the network. In other embodiments, the compressed scan list may comprise just the SSID or a basic service set identifier (BSSID) field. In further embodiments, one or more other fields may be included or a different set of fields may be included with the minimum requirement being that the fields, individually or as a whole, distinguish the entries in the scan list.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1007, 1010, 1030, 1050, and 1055.

The communications device 1010 comprises memory 1011, Media Access Control (MAC) sublayer logic 1022, physical layer logic 1024, and an antenna array 1026. The memory 1011 may comprise a storage medium such as Dynamic Random Access Memory (DRAM), read only memory (ROM), flash memory, a hard disk drive, a solid-state drive, or the like. The memory 1011 may store the frames such as the beacon frame, association request frame, association response frame, and the like and/or frame structures for such frames, or portions thereof. The memory 1011 may also comprise a preference or set of preferences related to operations of the communications device 1010.

The MAC sublayer logic 1022 may comprise logic to implement functionality of the MAC sublayer of the data link layer of the communications device 1010. The MAC sublayer logic 1022 may generate the frames such as beacon frames and the physical layer logic 1024 may generate physical layer protocol data units (PPDUs) based upon the frames. More specifically, the MAC sublayer logic 1022 may generate frames and the physical layer logic 1024 may encapsulate the frames with preambles to generate PPDUs for transmission via a physical layer device such as the antenna 1026.

The communications devices 1007, 1010, 1030, 1050, and 1055 may each comprise a transceiver. Each transceiver may comprise an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom.

FIG. 1 may depict a number of different embodiments including a Multiple-Input, Multiple-Output (MIMO) system with, e.g., four spatial streams, and may depict degenerate systems in which one or more of the communications devices 1007, 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system.

Figure 2:
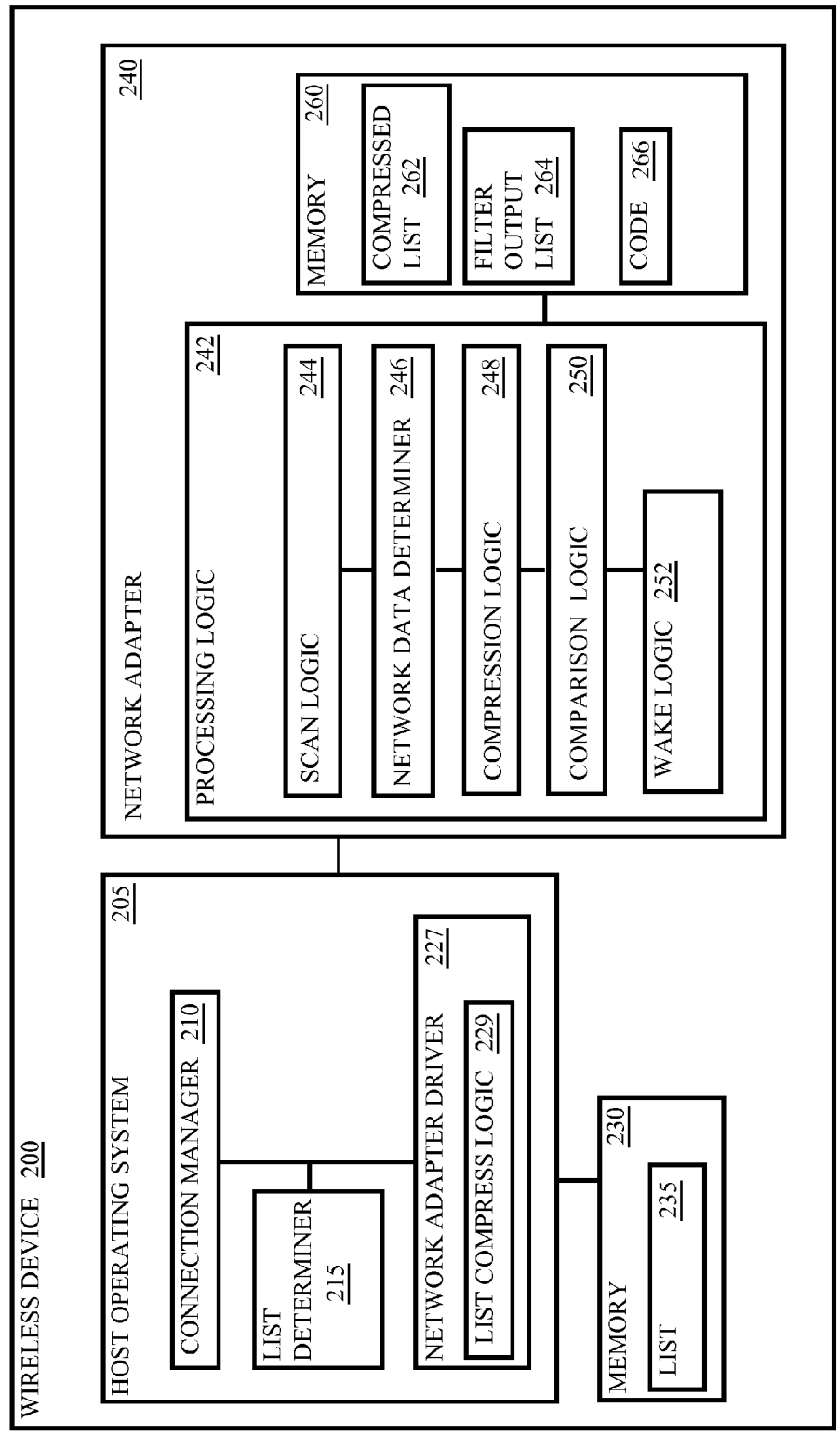
FIG. 2 depicts an embodiment of an apparatus to offload scans to identify selected network availability.

FIG. 2 depicts an embodiment of a wireless device 200 to offload scans to identify selected network availability. The wireless device 200 may comprise a laptop, smart phone, personal data assistant, tablet, netbook, or the like. In many embodiments, the wireless device 200 may dramatically increase the experience of Intel Smart Connect (Always On Always Connected). Intel Smart Connect is a rapid start technology that updates content such as email continuously while a device is in a sleep mode.

The wireless device 200 may comprise a host operating system 205 that operates on a host processing system of the wireless device, a memory 230, and a network adapter 240. The host operating system 205 may comprise an operating system for a computer, netbook, smart phone, personal data assistant, cellular phone, or the like such as a Microsoft operating system, an Oracle operating system, an Apple Inc. operating system, or the like. In further embodiments, more than one operating systems may be executing on the wireless device 200.

The host operating system 205 may instruct the network adapter 240 to enter a scan mode at a point just before, just after, or as the wireless device 200 enters a sleep state. In some embodiments, the host operating system 205 may have multiple sleep states and the scan mode for the network adapter 240 may be associated with one or more of the sleep states.

The host operating system 205 may comprise a number of applications such as a connection manager 210, a list determiner 215, and a network adapter driver 227. The connection manager 210 may comprise logic to make decisions about which network to connect to based on user preferences and what has been discovered in wireless proximity. In some embodiments, the connection manager 210 may comprise a component of the host operating system 205. In other embodiments, the connection manager 210 may comprise logic supplied by a third party vendor. For example, the connection manager 210 may determine networks to represent in a scan list 235.

In several embodiments, the connection manager 210 may communicate with the network adapter 240 when the network adapter 240 identifies the availability of a network through an access point identified in the compressed scan list 262. The network adapter 240 may provide the data related to the network or some other indication of the network or access point to the connection manager 210 and the connection manager 210 may determine, based upon user preferences, whether the wireless device 200 should establish communications with the network via the access point. In many embodiments, if the connection manager 205 determines that the wireless device 200 should communicate with the access point, the connection manager 210 may wake the wireless device 200 or at least signal the wireless device 200 to move to a higher power consumption state to communicate with the access point. In other embodiments, a wake signal from wake logic 250 of the network adapter 240 may cause the wireless device 200 to change to a higher power consumption state or wake from the sleep state.

The list determiner 215 may couple with the connection manager 210 to create a list of all the possible, e.g., WiFi networks and devices to which the wireless device 200 may connect. The list determiner 215 may select the complete or a subset of this list and send the selection to the network adapter 240. For instance, the list determiner 215 may restrict networks represented in the scan list 235 to networks that are in and around a user's place of business, home, and airports through which the user may typically travel. In further embodiments, the list determiner 215 may restrict the list of networks represented in the scan list 235 to networks within the country in which the user resides or within a certain radius from the user's location. In the latter embodiments, a new or updated scan list 235 may be transmitted to the network adapter 240 periodically, at times manually requested by a user, and/or at times pre-established by a user or otherwise. In some embodiments, the list determiner 215 may comprise a WiFi software development kit (SDK) product, a wpa supplicant product, or the like.

The network adapter driver 227 may comprise a driver for the network adapter 240 such as a WiFi driver. In many embodiments, the network adapter driver 227 may comprise a component that acts as a pass-through component with regards of the scan list 235. In the present embodiment, the network adapter driver 227 may comprise list compression logic 229. The list compression logic 229 may compress the selected entries of the scan list or the complete scan list 235, depending upon the actions of the list determiner 215, and transmit the compressed scan list 235 to the network adapter 240. In further embodiments, the list compression logic 229 may interact with the network data determiner 246 and/or the compression logic 248 to compress the scan list 235 and store the compressed scan list 262 in the memory 260 of the network adapter 240.

The network adapter 240 may comprise an adapter for wireless communications such as WiFi and may interface the host operating system 205 via the network adapter driver 227. In many embodiments, the network adapter 240 may comprise a combination of hardware and code 266 to implement many of the features. In some of the embodiments, some or all of the processing logic 242 may be implemented in hardware and state machines or specific purpose processor pipelines to increase the speed of processing.

In the present embodiment, the network adapter 240 comprises processing logic 242, which implements logic with a combination of hardware and microcode identified as code 266, and memory 260. The memory 260 may store the compressed list 262, code 266, and, in some embodiments, a filter output list 264 that tracks the last network identified by the scans performed by the network adapter 240 or a number of the recently identified servers. The code 266 takes the configured WiFi and device list and creates a compressed representation of based on a selected filter and hashing algorithm. In many embodiments, the filters and hashing algorithms may be selected prior to deployment. In further embodiments, the filters and algorithms may be tunable by the user. For example, some embodiments may facilitate selection of a small number of parameters by a user to balance, e.g., the number of network entries in the compressed scan list 262 against the battery power consumption that may result from false positives. In further embodiments, the user may only be able to adjust one parameter and the remainder of the parameters may be determined by calculations. In still other embodiments, the user may be able to enter settings descriptive of use of the wireless device by the user and the processing logic 242 may determine appropriate parameter settings based upon answers to questions provided by the user via a user interface for the network adapter driver 227.

In several embodiments, the processing logic 242 may comprise logic to such as a processor and code to execute a number different functions. In the present embodiment, the processing logic 242 comprises scan logic 244, a network data determiner 246, compression logic 248, comparison logic 250, and wake logic 252. The scan logic 244 may respond to an instruction from the host operating system 205 or to the wireless device 200 entering a sleep state by initiating a scan mode. In the scan mode, the scan logic 244 may scan for the pre-configured networks and devices described in the compressed scan list periodically at, e.g., a predefined scan interval. In some embodiments, the scan logic 244 may implement passive scanning techniques, such as monitoring for receipt of a packet from an access point. In further embodiments, the scan logic 244 may implement active scanning techniques, such as probing for the networks and devices.

When the scan logic identifies a network, e.g., by receiving a beacon or a response to a probe, the network data determiner 246 may parse the data about the network that can be used to compare the network to the compressed scan list 262. In the present embodiment, the compressed scan list 262 may comprise, e.g., the WiFi network and device database compressed into a bitmap using hash functions. In response to detecting a network or device and determining data for the network that corresponds to data included in the compressed scan list 262, the compression logic 248 may calculate hash functions on the network data and provide the output of the hash functions to a Bloom Filter implementation of the compression logic 248.

A Bloom filter is a space-efficient probabilistic data structure that is used to test whether an element is a member of a set. False positives are possible, but false negatives are not; i.e. a query returns either an indication that the network data is in the compressed scan list 262, although this may be an incorrect result, or the query returns an indication that the network data is definitely not in the compressed scan list 262. In many embodiments, entries can be added to the compressed scan list 262 but not removed. In further embodiments, additional functionality allows entries to be removed from the Bloom filter implementation. The more elements that are added to the set, the larger the probability of false positives.

An empty Bloom filter may be a bit array of M bits, all set to 0. In such filters, K different hash functions are defined, each of which to map or hash some entry in the compressed scan list 262 to one of the M array positions with a uniform random distribution. To add an entry to the compressed scan list 262, the compression logic 248 may feed the entry to each of the K hash functions to get K array positions. The compression logic 248 may then set the bits at all these K array positions to one.

To query for an entry within the compressed scan list 262, the comparison logic 250 may feed the entry to each of the K hash functions to get K array positions. If any of the bits at these positions are zero, the entry is definitely not in the compressed scan list 262. If all of the bits at these positions are one, the entry is in the compressed scan list 262 or the bits have by chance been set to one during the insertion of other entries, resulting in a false positive. Some embodiments implement a simple bloom filter that does not provide a way to distinguish between the positive result and the false positive result. In other embodiments, more advanced techniques can improve the ability to determine whether or not a positive is a false positive, effectively or directly reducing the probability of a false positive.

In response to a positive or, in some embodiments, a false positive output by the comparison logic 250 to the wake logic 252, the wake logic 252 may transmit a signal to the connection manager 210 to communicate the positive result of identifying the network in the scan list. In some embodiments, the comparison logic 250 may also store an indication of the network that was identified in the filter output list 264.

To illustrate, some embodiments may include 2^13-8192 entries in the compressed scan list 262. For one such embodiment, the bit map size divided by the number of elements may equal eight. Thus, eight kilobytes of memory space are needed in the memory 260 of the network adapter 240. If the number of hash functions, K, is equal to six, the Bloom filter implementation by the comparison logic 250 may result in false positives in 2.16% of the comparisons made by the comparison logic 250.

For another such embodiment, the bit map size divided by the number of elements may equal 16. Thus, 16 kilobytes of memory space are needed in the memory 260 of the network adapter 240. If the number of hash functions, K, is equal to six, the Bloom filter implementation by the comparison logic 250 may result in false positives in 0.0935% of the comparisons made by the comparison logic 250.

For comparison, the uncompressed representation of the scan list with 2^13-8192 entries would be approximately 272 kilobytes of space assuming that the network data for each entry comprises a server set identifier that is 32 bytes, an authentication mode that is one kilobyte, and an encryption type that is one kilobyte.

FIGS. 3A-C depict embodiments of flowcharts to offload scans to identify selected network availability. Referring to FIG. 3A, the flowchart 300 may begin with configuring the connection manager and the list determiner (element 305) such as the connection manager 210 and the list determiner 215 described in FIG. 2. The user or administrator may configure the numbers and types of networks and devices for which the host device should awake to communicate, e.g., push and/or pull notifications with servers. In some embodiments, the user may also set geographical limitations on the network and device entries to avoid inclusion of entries that may not be feasibly within the wireless communication capabilities of the host device because reducing the numbers of entries in the scan list to remove unusable entries can improve performance of the scanning by the network adapter.

In many embodiments, the user may also set up the frequency at which the host device may update the scan list and provide the scan list to the network adapter. For instance, the connection manager may be configured to maintain a scan list and update the scan list in the background operations of the host device periodically. In several embodiments, the connection manager may be configured to generate a compressed scan list or interact with the network adapter in background operations to compress the scan list periodically and transmit the compressed list to the network adapter (element 310) so the compressed scan list maintained can be up-to-date when the host device switches to a sleep state. In alternative embodiments, the network adapter may compress the scan list while the scan list is transmitted to the network adapter (element 310).

After configuring the connection manager and the list determiner with user preferences, the host operating system may trigger a scan and power save (element 315). In many embodiments, the scan may be triggered upon initiating the power save operation to place the host device in the sleep state.

Referring to FIG. 3B, the flowchart 320 may begin with receiving a scan list (element 305). The host device or the network adapter may receive a scan list and may generate a compressed scan list to store in the memory of the network adapter. In some embodiments, the scan list may be transferred to a cloud server and an application residing on the cloud server may generate a compressed scan list for the network adapter.

After receiving or during receipt of the scan list, the host device, network adapter, cloud application, or the like, may truncate the list (element 330) by removing entries that are, according to the user preferences or default settings, are not desirable or useful in the compressed scan list. Furthermore, the number of elements or fields in the scan list may be more than are determined to be included in the compressed scan list so these fields or elements may be removed from the scan list. In still further embodiments, individual fields that will remain in the compressed scan list may be truncated to remove repetitive data that will not be useful in distinguishing the entries in the scan list.

After truncating the scan list, compression logic in the host device, network adapter, cloud application, or the like, may generate the compressed scan list (element 335). Generating the compressed scan list may involve one or more layers of compression. For instance, some embodiments may compress individual fields or elements. Further embodiments may compress the entries as a whole. Still further embodiments may compress the scan list as a whole. And some embodiments may perform one or more of each of these layers of compression. Many embodiments may implement a filter such as a Bloom filter to generate the compressed scan list.

Referring to FIG. 3C, the flowchart 340 may begin with identifying a network (element 305). The network adapter may scan, actively or passively, for a network and identify the network by receiving data to describe the network. A network data determiner may parse the data received for the network to determine network data that corresponds to data in the compressed scan list (element 350). In some embodiments, the network data determiner may, for instance, parse a beacon frame to determine a server set identifier, an authentication mode, and an encryption type. In further embodiments, the network data determiner may collect additional network data in addition to or in lieu of the server set identifier, authentication mode, and encryption type.

After collecting the network data from the identified network, the compression logic may compress the network data (element 355). In some embodiments, compressing the data may involve application of one or more hash functions to the network data. The compressed network data may then be compared against the compressed scan list (element 360) by comparison logic by, e.g., inputting the hashed fields or elements into a Bloom filter implementation, which may be accomplished in some embodiments by splitting the output of a single long hash function or, in other embodiments, by incrementing the initial values input for a hash function that uses initial values. In further embodiments, adding or appending incremented values to the key for a hash function may generate multiple hash functions.

The comparison logic may output a value of, e.g., one or more logical ones or zeros to indicate whether or not the network identified is in the same as an entry in the compressed scan list. If the output indicates that the entry is in the compressed scan list, the comparison logic may determine that the entry is one of the networks in the list (element 365) and transmit a signal to the connection manager of the host operating system to wake the host device (element 370). In some embodiments, the comparison output of an indication that the entry is included in the compressed scan list may be further processed to determine whether or not that output may be indicative of a false positive. If the additional processing determines that the output is a false positive, the wake logic may not wake the host device.

The following examples pertain to further embodiments. One example comprises a method. The method may involve storing, by a network adapter for a host device, a compressed scan list in memory of the network adapter, the compressed scan list comprising one or more compressed entries; identifying, by the network adapter, a network; collecting, by the network adapter, data about the network; compressing, by the network adapter, the data to generate compressed data; comparing, by the network adapter, the compressed data with at least one compressed entry in the compressed scan list to determine if the compressed data matches the at least one compressed entry; and transmitting, by the network adapter, a wake signal to the host device after determining that the compressed data matches the at least one compressed entry.

In some embodiments, the method may further comprise determining by a connection manager whether to connect to the network based upon user preferences. The method may further comprise receiving a scan list and compressing the scan list to generate a compressed scan list. In further embodiments of the method, identifying the network comprises receiving a beacon from an access point of the network. In some embodiments of the method, collecting the data comprises parsing the beacon to determine a service set identifier, an authentication mode, and an encryption type. In further embodiments of the method, identifying the network comprises probing for the network and collecting the data comprises parsing a frame responsive to the probing to determine a service set identifier, an authentication mode, and an encryption type. And, in some embodiments of the method, setting the bit comprises setting a bit in a signal field of the preamble.

At least one computer program product for communication of a packet with a short frame, the computer program product comprising a computer useable medium having a computer useable program code embodied therewith, the computer useable program code comprising computer useable program code configured to perform operations, the operations to carry out a method according to any one or more or all of embodiments of the method described above.

At least one system comprising hardware and code may carry out a method according to any one or more or all of embodiments of the method described above.

Another example comprises an apparatus. The apparatus may comprise memory, on a network adapter, to store a compressed scan list in the network adapter, the compressed scan list comprising one or more compressed entries; a scan logic, on the network adapter, to identify a network; a network data determiner, on the network adapter, to determine data about the network; compression logic, on the network adapter, to compress the data to generate compressed data; comparison logic, on the network adapter, to compare the compressed data with at least one compressed entry in the compressed scan list to determine if the compressed data matches the at least one compressed entry; and wake logic, on the network adapter, to transmit a wake signal to the host device after determining that the compressed data matches the at least one compressed entry.

In some embodiments, the apparatus may further comprise an antenna coupled with the apparatus to identify the network. In some embodiments, the apparatus may further comprise a connection manager of the host device to determine to connect to the network based upon user preferences. In some embodiments, the apparatus may further comprise processing logic, on the network adapter, to receive the compressed scan list. In some embodiments, the apparatus may further comprise processing logic to receive a scan list and compression logic to generate the compressed scan list based upon the scan list. In further embodiments of the apparatus, the network data determiner comprises logic to one or more select fields of the scan list and the compression logic comprises logic to hash the one or more fields of the scan list to generate the compressed scan list. In some embodiments of the apparatus, the network data determiner comprises logic to parse a beacon to determine a service set identifier, an authentication mode, and an encryption type.

Another example comprises a system. The system may comprise memory, on a network adapter, to store a compressed scan list in the network adapter, the compressed scan list comprising one or more compressed entries; an antenna; scan logic, on the network adapter, coupled with the antenna to identify a network; a network data determiner, on the network adapter, to determine data about the network; compression logic, on the network adapter, to compress the data to generate compressed data; comparison logic, on the network adapter, to compare the compressed data with at least one compressed entry in the compressed scan list to determine if the compressed data matches the at least one compressed entry; and wake logic, on the network adapter, to transmit a wake signal to the host device after determining that the compressed data matches the at least one compressed entry.

In some embodiments, the system may further comprise an antenna coupled with the apparatus to identify the network. In some embodiments, the system may further comprise a connection manager of the host device to determine to connect to the network based upon user preferences. In some embodiments, the system may further comprise processing logic, on the network adapter, to receive the compressed scan list. In further embodiments of the system, the system may further comprise processing logic to receive a scan list and compression logic to generate the compressed scan list based upon the scan list. In further embodiments of the system, the network data determiner comprises logic to one or more select fields of the scan list and the compression logic comprises logic to hash the one or more fields of the scan list to generate the compressed scan list. In further embodiments of the system, the network data determiner comprises logic to parse a beacon to determine a service set identifier, an authentication mode, and an encryption type Another embodiment is implemented as a program product for implementing systems, apparatuses, and methods described with reference to FIGS. 1-3. Embodiments can take the form of an entirely hardware embodiment, a software embodiment implemented via general purpose hardware such as one or more processors and memory, or an embodiment containing both specific-purpose hardware and software elements. One embodiment is implemented in software or code, which includes but is not limited to firmware, resident software, microcode, or other types of executable instructions.

Furthermore, embodiments can take the form of a computer program product accessible from a machine-accessible, computer-usable, or computer-readable medium providing program code for use by or in connection with a computer, mobile device, or any other instruction execution system. For the purposes of this description, a machine-accessible, computer-usable, or computer-readable medium is any apparatus or article of manufacture that can contain, store, communicate, propagate, or transport the program for use by or in connection with the instruction execution system or apparatus.

The medium may comprise an electronic, magnetic, optical, electromagnetic, or semiconductor system medium. Examples of a machine-accessible, computer-usable, or computer-readable medium include memory such as volatile memory and non-volatile memory. Memory may comprise, e.g., a semiconductor or solid state memory like flash memory, magnetic tape, a removable computer diskette, a random access memory (RAM), a read-only memory (ROM), a rigid magnetic disk, and/or an optical disk. Current examples of optical disks include compact disk-read only memory (CD-ROM), compact disk-read/write memory (CD-R/W), digital video disk (DVD)-read only memory (DVD-ROM), DVD-random access memory (DVD-RAM), DVD-Recordable memory (DVD-R), and DVD-read/write memory (DVD-R/W).

An instruction execution system suitable for storing and/or executing program code may comprise at least one processor coupled directly or indirectly to memory through a system bus. The memory may comprise local memory employed during actual execution of the code, bulk storage such as dynamic random access memory (DRAM), and cache memories which provide temporary storage of at least some code in order to reduce the number of times code must be retrieved from bulk storage during execution.

Input/output or I/O devices (including but not limited to keyboards, displays, pointing devices, etc.) can be coupled to the instruction execution system either directly or through intervening I/O controllers. Network adapters may also be coupled to the instruction execution system to enable the instruction execution system to become coupled to other instruction execution systems or remote printers or storage devices through intervening private or public networks. Modem, Bluetooth™, Ethernet, Wi-Fi, and WiDi adapter cards are just a few of the currently available types of network adapters.

The logic as described above may be part of the design for an integrated circuit chip. The chip design can be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the graphical computer programming language of the design by physical means (e.g., by providing a copy of the storage medium storing the design) or electronically (e.g., through the Internet) to such entities, directly or indirectly. The design may then be converted into the appropriate format (e.g., GDSII) for the fabrication of photolithographic masks, which typically include multiple copies of the chip design in question that are to be formed on a wafer. The photolithographic masks can be utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case, the chip can be mounted in a single chip package (such as a plastic carrier, with leads that are affixed to a motherboard or other higher level carrier) or in a multichip package (such as a ceramic carrier that has either or both surface interconnections or buried interconnections). In any case, the chip may then be integrated with other chips, discrete circuit elements, and/or other signal processing devices as part of either (a) an intermediate product, such as a motherboard, or (b) an end product. The end product can be any product that comprises integrated circuit chips, ranging from toys and other low-end applications to advanced computer products such as mobile devices having, e.g., a display, a keyboard or other input device, and a processor.

It will be apparent to those skilled in the art having the benefit of this disclosure that the present disclosure contemplates offloading scans of large scan lists. It is understood that the form of the embodiments shown and described in the detailed description and the drawings are to be taken merely as examples. It is intended that the following claims be interpreted broadly to embrace all variations of the example embodiments disclosed.

The disclosure of the present application is not intended to be limited to the particular embodiments of the process, machine, manufacture, composition of matter, means, methods, and steps described in the specification. As one of ordinary skill in the art will readily appreciate from this disclosure, processes, machines, manufacture, compositions of matter, means, methods, or steps presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method comprising:
   storing, by a network adapter for a host device, a compressed scan list in memory of the network adapter, the compressed scan list comprising one or more compressed entries;
   identifying, by the network adapter, a network;
   collecting, by the network adapter, data about the network;
   compressing, by the network adapter, the data to generate compressed data;
   comparing, by the network adapter, the compressed data with at least one compressed entry in the compressed scan list to determine if the compressed data matches the at least one compressed entry; and
   transmitting, by the network adapter, a wake signal to the host device after determining that the compressed data matches the at least one compressed entry.

2. The method of claim 1, further comprising determining by a connection manager whether to connect to the network based upon user preferences.

3. The method of claim 1, further comprising:
   receiving a scan list and
   compressing the scan list to generate a compressed scan list.

4. The method of claim 1, wherein identifying the network comprises receiving a beacon from an access point of the network.

5. The method of claim 1, wherein compressing the data comprises hashing at least a portion of the data to determine the compressed data.

6. An apparatus comprising:
   memory, on a network adapter, to store a compressed scan list in the network adapter, the compressed scan list comprising one or more compressed entries;
   a scan logic, on the network adapter, to identify a network;
   a network data determiner, on the network adapter, to determine data about the network;
   compression logic, on the network adapter, to compress the data to generate compressed data;
   comparison logic, on the network adapter, to compare the compressed data with at least one compressed entry in the compressed scan list to determine if the compressed data matches the at least one compressed entry; and
   wake logic, on the network adapter, to transmit a wake signal to the host device after determining that the compressed data matches the at least one compressed entry.

7. The apparatus of claim 6, further comprising an antenna coupled with the apparatus to identify the network.

8. The apparatus of claim 6, further comprising a connection manager of the host device to determine to connect to the network based upon user preferences.

9. The apparatus of claim 6, further comprising processing logic, on the network adapter, to receive the compressed scan list.

10. The apparatus of claim 6, further comprising processing logic to receive a scan list and compression logic to generate the compressed scan list based upon the scan list.

11. The apparatus of claim 10, wherein the network data determiner comprises logic to one or more select fields of the scan list and the compression logic comprises logic to hash the one or more fields of the scan list to generate the compressed scan list.

12. At least one computer program product to identify a network, the computer program product comprising a non-transitory computer useable medium having a computer useable program code embodied therewith, the computer useable program code comprising computer useable program code configured to perform operations, the operations comprising:
   storing, by a network adapter for a host device, a compressed scan list in memory of the network adapter, the compressed scan list comprising one or more compressed entries;
   identifying, by the network adapter, a network;
   collecting, by the network adapter, data about the network;
   compressing, by the network adapter, the data to generate compressed data;
   comparing, by the network adapter, the compressed data with at least one compressed entry in the compressed scan list to determine if the compressed data matches the at least one compressed entry; and
   transmitting, by the network adapter, a wake signal to the host device after determining that the compressed data matches the at least one compressed entry.

13. The at least one computer program product of claim 12, further comprising operations of determining by a connection manager of the host device to connect to the network based upon user preferences.

14. The at least one computer program product of claim 12, further comprising operations of:
   receiving a scan list and
   compressing the scan list to generate a compressed scan list.

15. The at least one computer program product of claim 12, wherein identifying the network comprises receiving a beacon from the network.

16. The at least one computer program product of claim 12, wherein compressing the data comprises hashing at least a portion of the data to determine the compressed data.

17. A system comprising:
   memory, on a network adapter, to store a compressed scan list in the network adapter, the compressed scan list comprising one or more compressed entries;
   an antenna;
   scan logic, on the network adapter, coupled with the antenna to identify a network;
   a network data determiner, on the network adapter, to determine data about the network;

compression logic, on the network adapter, to compress the data to generate compressed data;

comparison logic, on the network adapter, to compare the compressed data with at least one compressed entry in the compressed scan list to determine if the compressed data matches the at least one compressed entry; and wake logic, on the network adapter, to transmit a wake signal to the host device after determining that the compressed data matches the at least one compressed entry.

18. The system of claim 17, further comprising an antenna coupled with the apparatus to identify the network.

19. The system of claim 17, further comprising a connection manager of the host device to determine to connect to the network based upon user preferences.

20. The system of claim 17, further comprising processing logic, on the network adapter, to receive the compressed scan list.

21. The system of claim 17, further comprising processing logic to receive a scan list and compression logic to generate the compressed scan list based upon the scan list.

22. The system of claim 21, wherein the network data determiner comprises logic to one or more select fields of the scan list and the compression logic comprises logic to hash the one or more fields of the scan list to generate the compressed scan list.

* * * * *